United States Patent
Muktinutalapati et al.

(10) Patent No.: US 8,284,190 B2
(45) Date of Patent: Oct. 9, 2012

(54) REGISTRATION OF STREET-LEVEL IMAGERY TO 3D BUILDING MODELS

(75) Inventors: Kartik Chandra Muktinutalapati, Boulder, CO (US); Mark David Tabb, Estes Park, CO (US); Pete Nagy, Lyons, CO (US); Zhaoqiang Bi, Redmond, WA (US); Gur Kimchi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 374 days.

(21) Appl. No.: 12/145,515

(22) Filed: Jun. 25, 2008

(65) Prior Publication Data
US 2009/0322742 A1    Dec. 31, 2009

(51) Int. Cl.
*G06T 15/00* (2006.01)
*G06T 17/00* (2006.01)

(52) U.S. Cl. .......................... 345/419; 345/420

(58) Field of Classification Search .................. None
See application file for complete search history.

(56) References Cited

U.S. PATENT DOCUMENTS

| | | | |
|---|---|---|---|
| 5,652,717 A | 7/1997 | Miller et al. | |
| 6,072,903 A * | 6/2000 | Maki et al. | 382/190 |
| 6,330,523 B1 * | 12/2001 | Kacyra et al. | 702/159 |
| 6,420,698 B1 | 7/2002 | Dimsdale | |
| 6,597,818 B2 * | 7/2003 | Kumar et al. | 382/294 |
| 7,103,211 B1 * | 9/2006 | Medioni et al. | 382/154 |
| 7,616,807 B2 * | 11/2009 | Zhang et al. | 382/154 |
| 2002/0145607 A1 | 10/2002 | Dimsdale | |
| 2003/0012410 A1 * | 1/2003 | Navab et al. | 382/103 |
| 2003/0014224 A1 | 1/2003 | Guo et al. | |
| 2005/0151963 A1 * | 7/2005 | Pulla et al. | 356/139.03 |
| 2006/0061566 A1 | 3/2006 | Verma et al. | |
| 2006/0072176 A1 | 4/2006 | Silverstein et al. | |
| 2006/0188131 A1 | 8/2006 | Zhang et al. | |
| 2007/0076920 A1 | 4/2007 | Ofek | |
| 2007/0269102 A1 | 11/2007 | Wang | |
| 2007/0286459 A1 | 12/2007 | Gal et al. | |

(Continued)

FOREIGN PATENT DOCUMENTS

JP    2007026201 A    2/2007

OTHER PUBLICATIONS

Hu, J., You, S., and Neumann, U. 2006. Integrating LiDAR, Aerial Image and Ground Images for Complete Urban Building Modeling. In Proceedings of the Third international Symposium on 3D Data Processing, Visualization, and Transmission (3dpvt'06) (Jun. 14-16, 2006). 3DPVT. IEEE Computer Society, Washington, DC.*

(Continued)

*Primary Examiner* — Daniel Hajnik

(57) ABSTRACT

Point of origin information for image data may be inaccurately registered against a geographic location absolute. A process for aligning image and highly accurate model data adjusts a point of origin of the image data by matching elements in the image with corresponding elements of the model. In a street-level image, building skylines can be extracted and corresponding skylines from the building model can be placed over the image-based skyline. By adjusting the point of origin of the image, the respective skylines can be aligned. Building edge and facade depth information can similarly be matched by adjusting the image point of origin of the image. The adjusted point of origin of the image can be used to then automatically place images on the models for a long run of images.

17 Claims, 9 Drawing Sheets

U.S. PATENT DOCUMENTS

2008/0021683 A1 1/2008 Rahmes et al.
2008/0050011 A1 2/2008 Ofek et al.

OTHER PUBLICATIONS

Hu, J., You, S., and Neumann, U. 2006. Automatic Pose Recovery for High-Quality Textures Generation. In Proceedings of the 18th international Conference on Pattern Recognition—vol. 01 (Aug. 20-24, 2006). ICPR. IEEE Computer Society, Washington, DC, 561-565. DOI= http://dx.doi.org/10.1109/ICPR.2006.303.*

Früh, C., & Zakhor, A. (2004). An automated method for large-scale, ground-based city model acquisition. International Journal of Computer Vision, 60(1), 5-24.*

C. Jaynes and M. Partington. Pose calibration using approximately planar urban structure. Asian Conference on Computer Vision, 1999.*

Sung Chun Lee; Soon Ki Jung; Nevatia, R.; , "Automatic pose estimation of complex 3D building models," Applications of Computer Vision, 2002. (WACV 2002). Proceedings. Sixth IEEE Workshop on, vol., no., pp. 148-152.*

Written Opinion for PCT/US2009/044673 mailed Dec. 29, 2009.
International Search Report for PCT/US2009/044673 mailed Dec. 29, 2009.
Hu et al., "Building Modeling From LIDAR and Aerial Imagery", ASPRS'04, Denver, Colorado, USA, May 23-28, 2004, 8 pages.
Wang et al., "A Bayesian Approach to Building Footprint Extraction from Aerial LIDAR Data", Third International Symposium on 3D Data Processing, Visualization, and Transmission, Publication Date: Jun. 2006, pp. 192-199.
"Visual Learning Systems", http://www.vls-inc.com/lidar_analyst/benefits.htm, 2008.
Heinzer et al., "The Use of GIS to Manage LIDAR Elevation Data and Facilitate Integration with the MIKE21 2-D Hydraulic Model in a Flood Inundation Decision Support System", http://gis.esri.com/library/userconf/proc00/professional/papers/PAP675/p675.htm, 2008.
SIPO PR CHINA, Notice on the First Office Action for Application No. 200980124704.7, mailed Aug. 3, 2012, 15 pages.

* cited by examiner

REGISTRATION OF STREET-LEVEL IMAGERY TO 3D BUILDING MODELS

BACKGROUND

In many cases, the precise location of a vehicle can be determined using a combination of a global positioning system (GPS) receiver and an inertial measurement unit (IMU). Images taken from a vehicle using such location systems may be registered to a location using the positioning measurements provided by the GPS and IMU.

However, signal distortions in urban canyons, mechanical tolerances, wear, etc. may cause the reported location of one or more image sensors to be different from the actual location of the sensor in an unpredictable manner.

An example of such a mismatch is illustrated in FIG. 1, that shows a prior art result of an attempt to align building image data (e.g. photographic data) 50 with an existing three dimensional (3D) model 52 of the same building. As can be seen, the lack of accurate registration of the image source location to the geographic reference of the 3D model causes misalignment between the images 50 and the model 52.

SUMMARY

A system and method use a combination of image and high resolution scanning to align street-level images to 3D building models by systematically adjusting the origin point of the image data until a best match between the image and building model occurs. By performing the origin adjustment (e.g. a camera location) for the set of images they can be satisfactorily aligned. Further accuracy may be provided when images are chosen for opposite sides of a street, providing greater diversity of data for the alignment process.

The images are aligned with 3D models of buildings that may be generated using another technique, such as airborne laser ranging (LIDAR). The street-level (i.e. less than 20 feet above ground) images may be supplemented by street-level LIDAR data for building feature identification.

The images and street-level LIDAR are processed to extract building edges and skylines which are then projected against the 3D models. A cost, or figure of merit, is generated based on the distance between the extracted image edges and skylines, the street-level edges and facade depths, and the corresponding features of the 3D model. The camera location is then iteratively displaced about its calculated location and the cost recalculated. The lowest cost, corresponding to the best match between extracted features and modeled features is then selected and the corresponding camera location may be stored. The process may incorporate images from along a run of images including images from opposite sides, e.g. both sides of a street. As the source location is displaced, the lowest overall cost for all considered images represents the more accurate absolute position for the camera. FIG. 2 illustrates alignment of image 54 and 3D model 56 as a result of this technique.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using a sentence that begins "As used herein" and finishes with, "is hereby defined to mean . . . " or a similar sentence that defines the use of a particular term, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 3:
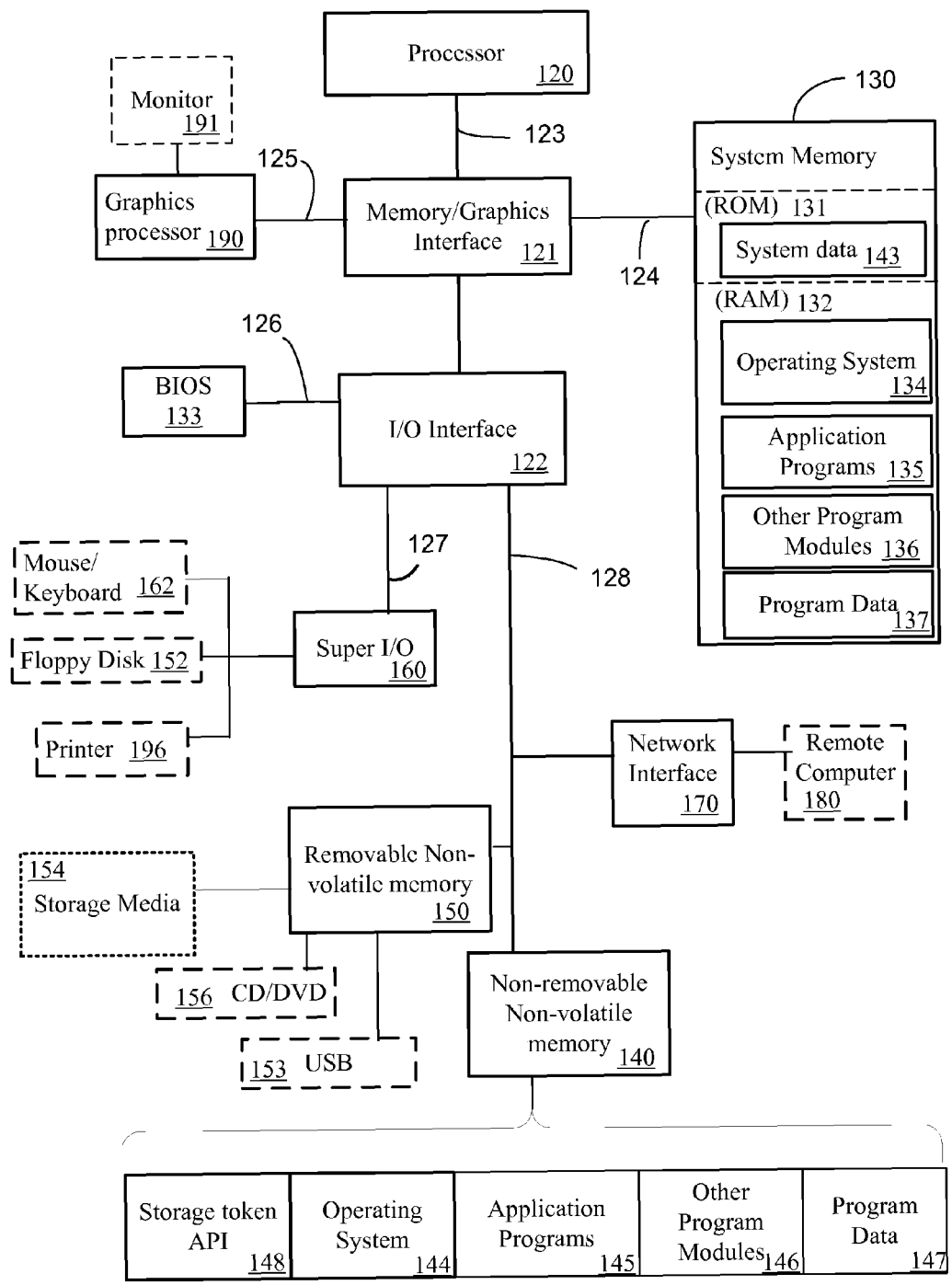
FIG. 3 is a block diagram of a general purpose computing device suitable for use in image registration.

With reference to FIG. 3, an exemplary system for implementing the claimed method and apparatus includes a general purpose computing device in the form of a computer 110. Components shown in dashed outline are not technically part of the computer 110, but are used to illustrate the exemplary embodiment of FIG. 3. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 3 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a bus 127, such as a low pin count (LPC) bus, in some embodiments. Various embodiments of the super I/O chip 160 are widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 3 illustrates a hard disk drive 140 that reads from or writes to non-removable, nonvolatile magnetic media.

Removable media, such as a universal serial bus (USB) memory 153, firewire (IEEE 1394), or CD/DVD drive 156 may be connected to the PCI bus 128 directly or through an interface 150. A storage media 154 may coupled through interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above, provide storage of computer readable instructions, data structures, program modules and other data for the computer 110. In FIG. 3, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 3 may include a local area network (LAN), a wide area network (WAN), or both, but may also include other networks. Such networking environments are commonplace in offices, enterprise-wide computer networks, intranets, and the Internet. The remote computer 180 may also represent a web server supporting interactive sessions with the computer 110.

In some embodiments, the network interface may use a modem (not depicted) when a broadband connection is not available or is not used. It will be appreciated that the network connection shown is exemplary and other means of establishing a communications link between the computers may be used.

Figure 1:
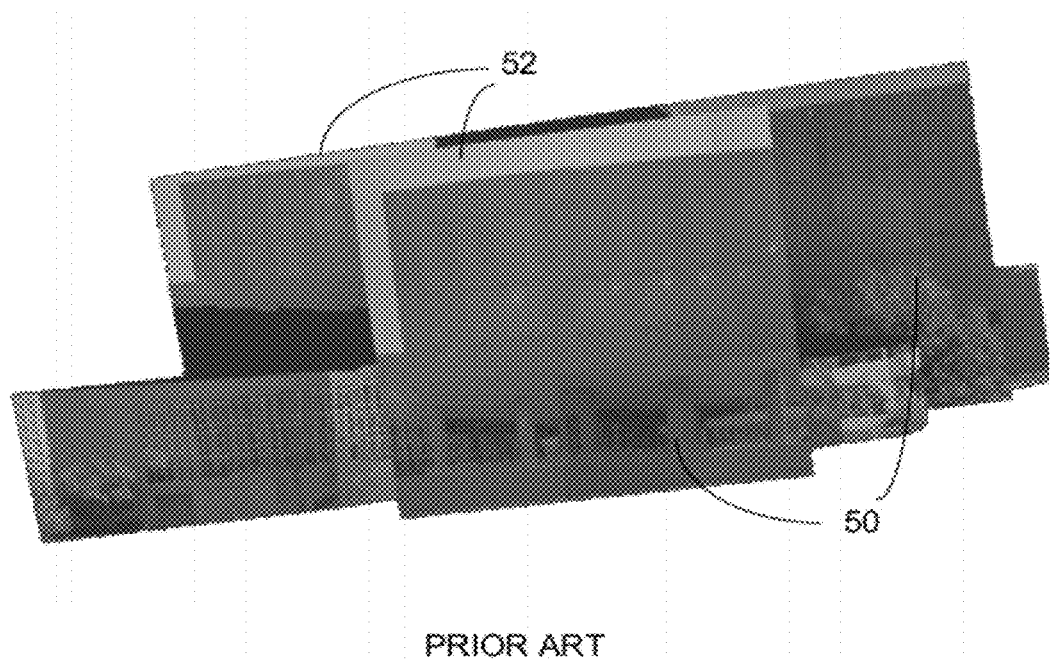
FIG. 1 is a prior art illustration of the result of incorrect origin location information on image and model alignment.
Figure 2:
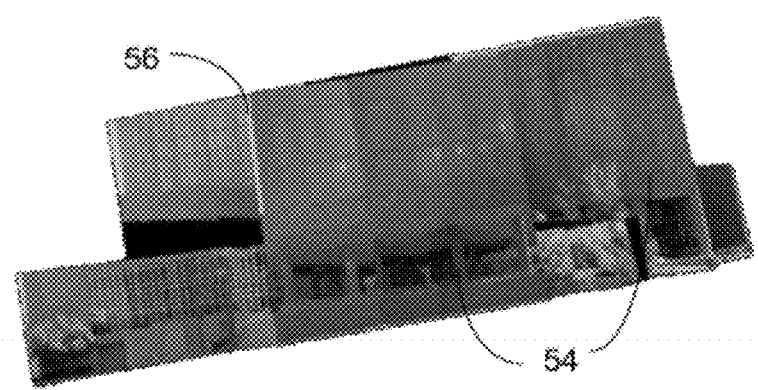
FIG. 2 is an illustration of alignment of image and model data as a result of accurate origin information.

FIGS. 4-8 illustrate how image data can be interpreted in view of a 3D model of the same scene to refine the accuracy of a camera location in geographic terms. In one embodiment utilizing this technique, a precision scanner, for example, light detection and ranging (LIDAR) equipment may be airplane mounted and used to capture geometry data for a geographic region, such as an urban area. From this LIDAR data, three dimensional models of the region including buildings may generated with accuracies on the order of 10 centimeters. While such as geographic model provides a valuable resource, breathing life into a scene may require that color and texture data be added to the 3D models. Street-level photographs can provide the desired realism, but, as shown in FIG. 1, when the photographic data is not aligned properly with the 3D model, an unintelligible jumble may result. Street-based LIDAR data can place the source location of the photographic data with respect to the object of the photograph (e.g. a building) within one centimeter, but location of the camera with respect to geographic coordinates, as used by the 3D model may be off by as much as a meter or more. When projecting photographic data on a 3D model of a building hundreds of meters in height, this source location inaccuracy can easily result in the mismatch of FIG. 1.

To address the geographic location inaccuracy of the camera, the more accurate airborne and street-level LIDAR data may be used to mathematically change the camera location coordinates until the images and street-level LIDAR data best fit the 3D models of the same scene. Once two points along a run of images, particularly near the ends of the run, are correctly located, images from other intervals along the run can use IMU data to accurately locate the intervening points.

Figure 4:
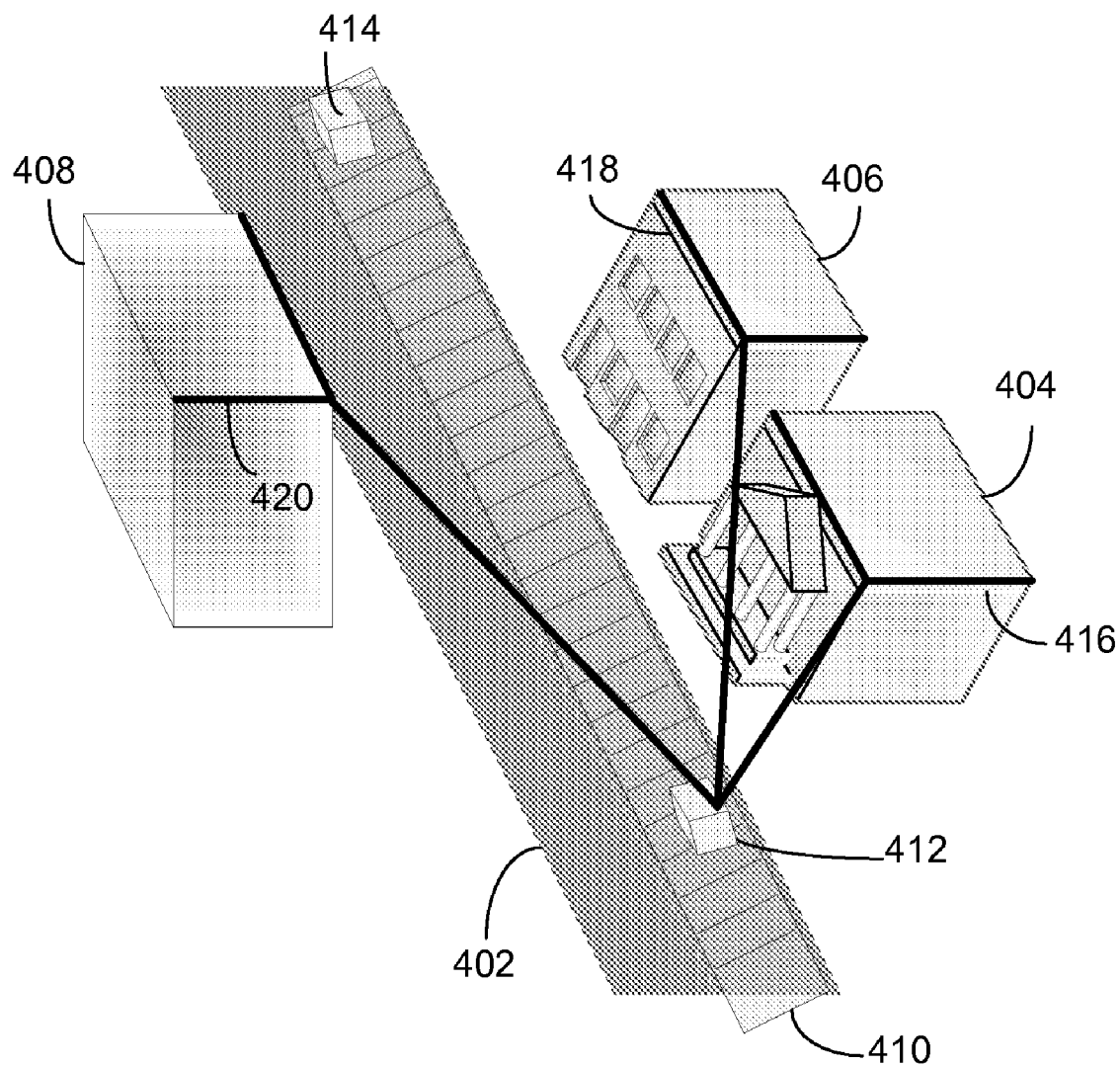
FIG. 4 is a block diagram illustrating skyline identification at one point in an image run.

FIG. 4 is a block diagram illustrating skyline identification at one point in an image run. A street 402 and representative buildings 404, 406, and 408 are shown representing a typical street environment. A track 410 illustrates a run path used in capturing image data along the track 410. Images may be captured at periodic intervals along the track. A representative first location 412, near the beginning of the track 410, shows representative skylines 416, 418, and 420 of the buildings from the perspective of the first location 412.

One embodiment uses a skyline detection algorithm based on an optimal path algorithm known in the art. The algorithm is dependent on edges, gradient magnitude and direction, as well as sky classification edges and vanishing point information. For example, a combination of edge and vanishing point may use a percentage of the sky classified pixels on the line joining the considered pixel to the vanishing point. Another skyline detection attribute may use an apriori estimated skyline based on existing building models, that is, the 3D model itself may be used to help determine the skyline in the image data.

The skyline data 416, 418, and 420 extracted for the buildings 404, 406, 408 respectively, may be used later when determining the source location as part of the comparison with the 3D model.

The depiction of the first and second locations 412 and 414, respectively, as cubes illustrates that the exact location of the source of the image at that point in the track 410 is an estimate in three dimensional space that may be more or less accurate, depending on the nature of the environment for GPS reception and IMU accuracy.

Figure 5:
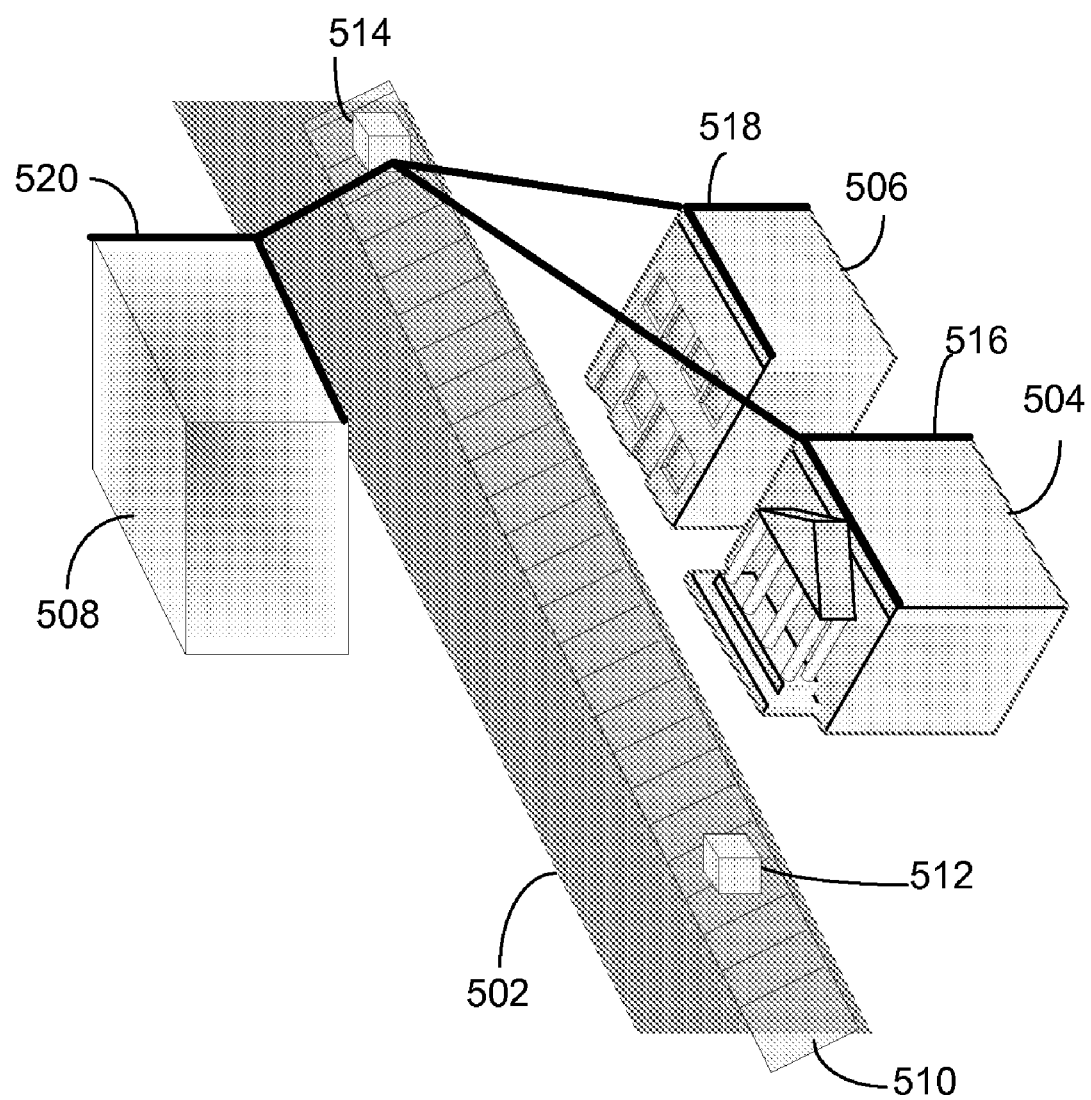
FIG. 5 is a block diagram illustrating skyline identification at another point in an image run.

FIG. 5 is a block diagram illustrating skyline identification at another point in an image run, such as the image run shown in FIG. 4. As above, a street 502 and buildings 504, 506, and 508 are shown. A track 510 shows the image run progression along the street, with images taken at intervals along the track 510, including representative first location 512 near the beginning and a representative second location 514, near the end of the track 510. In some embodiments, other images along the run may be used when calculating the best-fit actual position of the camera.

As shown, skyline detection may be used to determine the skyline 516, 518, 520 of each respective building 504, 506, 508 from the street-level perspective of the second location 514.

This information may then be combined with 3D model data to determine a correction factor for the geographic location of the camera from which the original street-level image was obtained.

Figure 6:
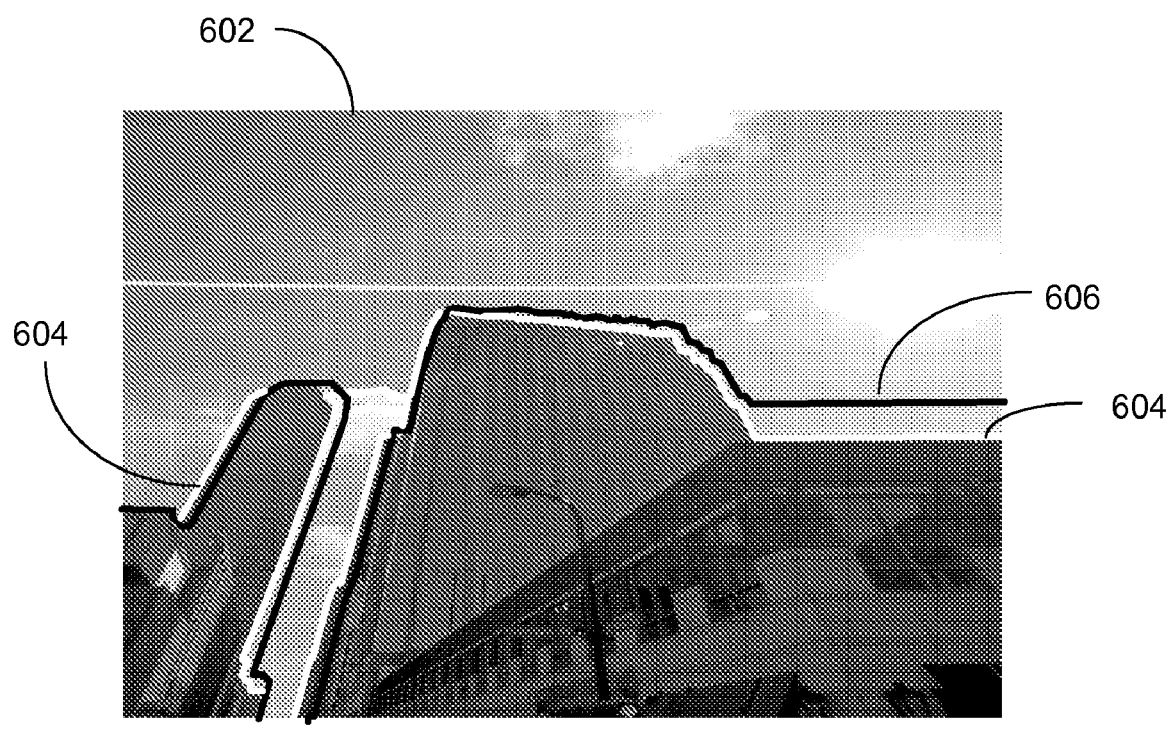
FIG. 6 is an illustration of skyline identification in a street-level image.

FIG. 6 is a street-level image 602 depicting several buildings and their associated skyline. The detected skyline 604 is shown with the white line. The black line 606 represents the projected skyline of the 3D model if the camera were actually at its reported location.

Figure 7:
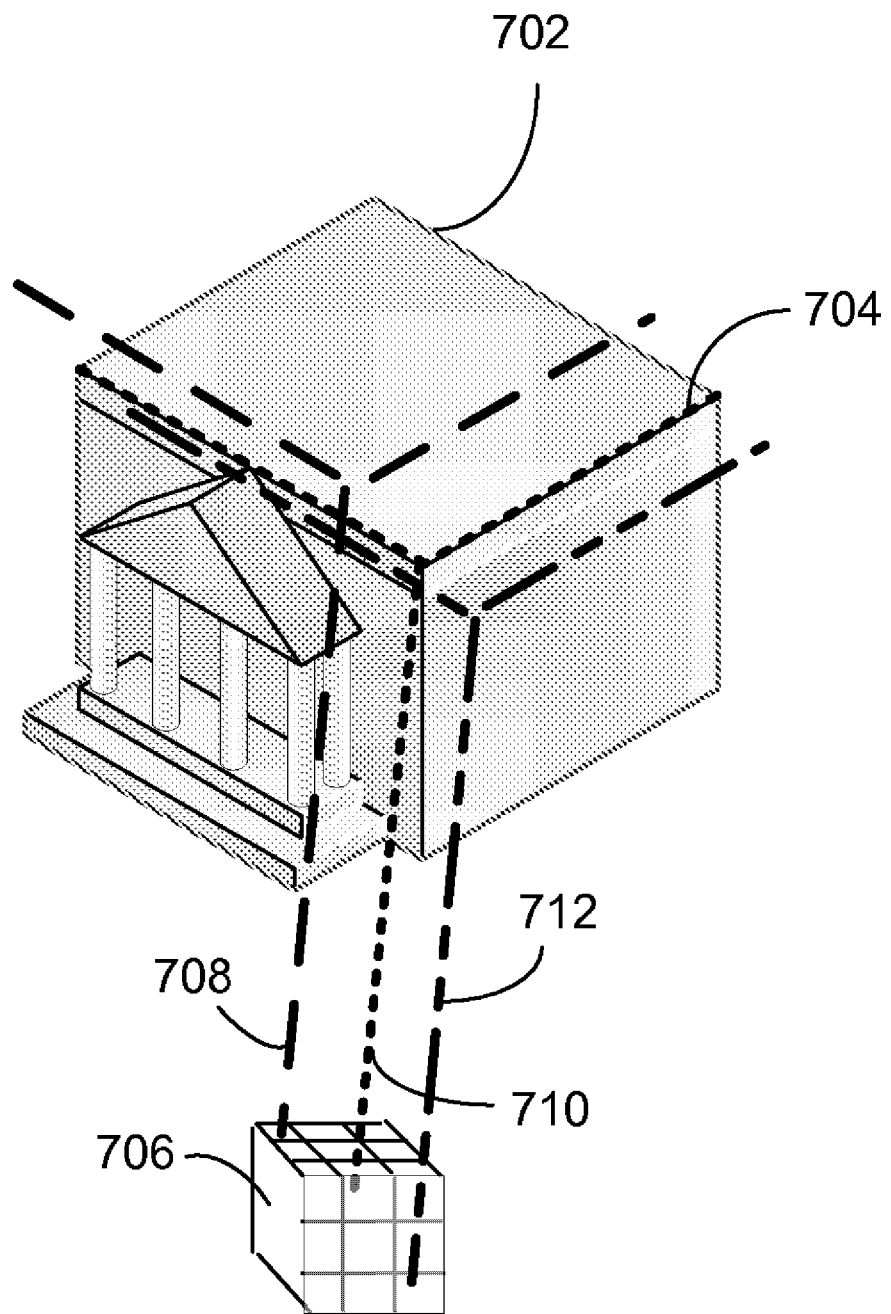
FIG. 7 is a block diagram illustrating origin location adjustment using skyline data.

FIG. 7 shows a representative building 702 with a detected skyline edge 704. A range over which an image source may be located is represented by cube 706. The cube 706 may be centered on the location of the camera as recorded by the GPS and IMU equipment.

As depicted in FIG. 7, projected skylines based on 3D model data may be compared to the detected skyline of the image. For example, a first projection 708 may be located from a top left corner of cube 706, a second projection 710 may be made with a camera location of top middle, and a third projection 712 may be made from a bottom right corner of the cube. In operation, camera locations over a 3×3×3 matrix around the measured location may be made. The distance between the extracted and projected skylines may be calculated as the e sum of absolute distance in x and y dimensions in image coordinates (abs($x1-x2$)+abs($y1-y2$)). In some embodiments, the distances beyond 100 pixels may not be considered to account for falsely detected parts of the skyline. The projection location associated with the closest match between detected and projected skylines may be selected and stored, in this example, projection 710 represents the best match. Because IMU data is extremely accurate along the run of a given track, performing the location operation using data from along the given track can be used to re-orient the entire track in one calculation.

Figure 8:
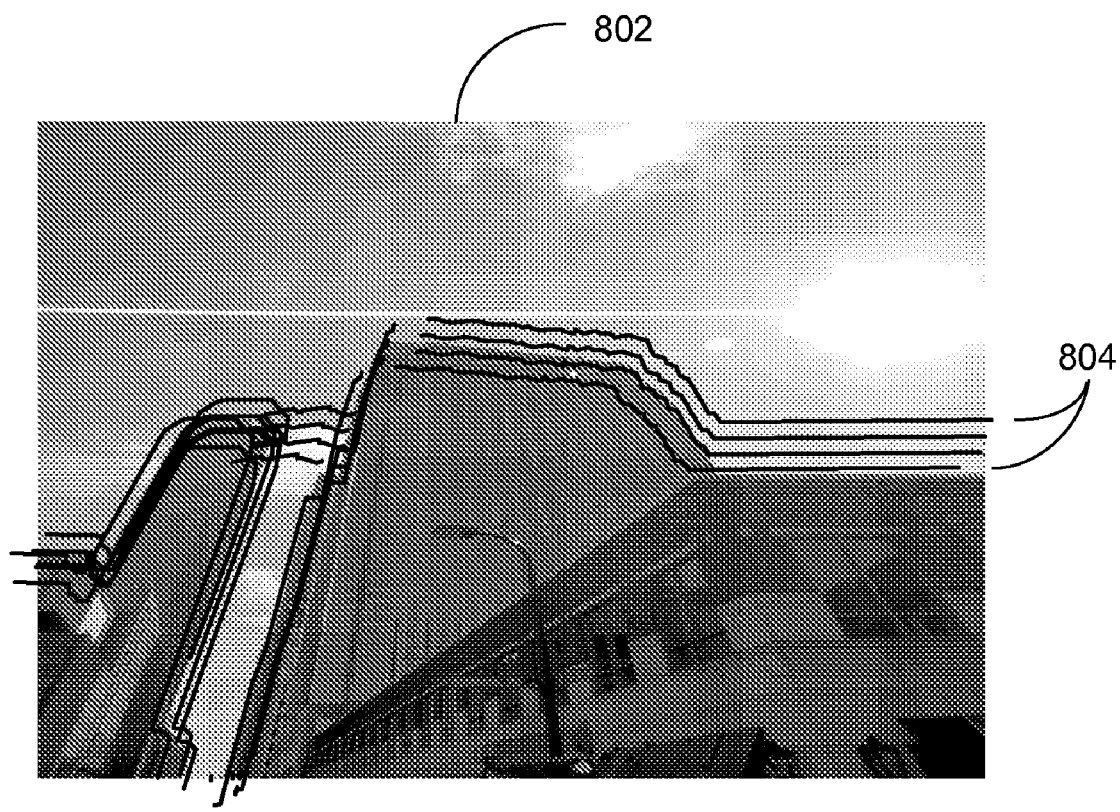
FIG. 8 is an illustration of skyline matching in a street-level image.

FIG. 8, depicts a street-level image 802 illustrating a plurality of projected skylines 804 representing different camera locations for generating the projected skylines 804.

Figure 9:
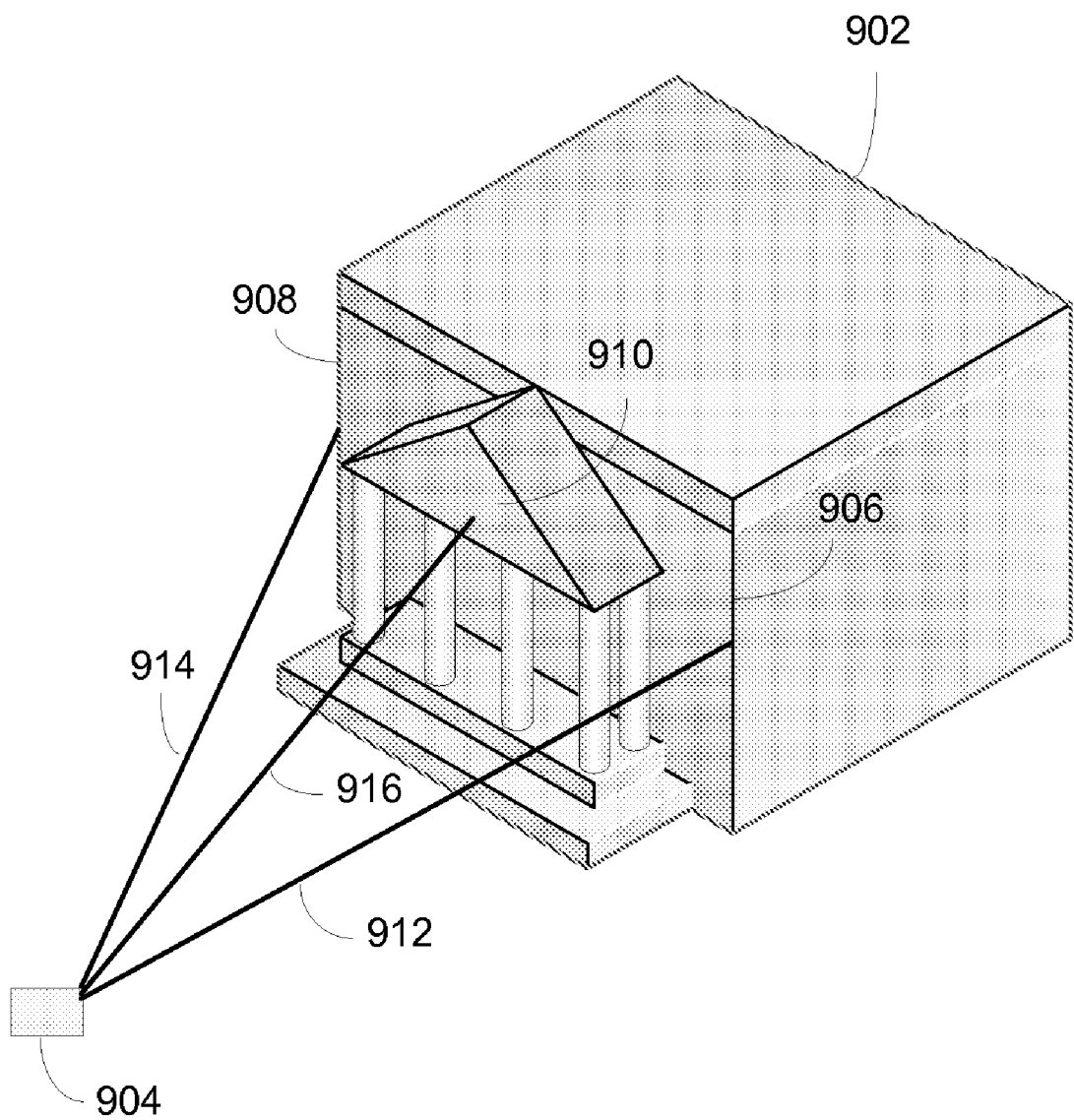
FIG. 9 is a block diagram illustrating LIDAR facade and building edge identification.

FIG. 9 illustrates use of street-level LIDAR data to supplement skyline data for image matching. A building 902 may be captured in image data from camera location 904. Edge data 906 and 908, and facade depth 910 may be recorded at the same time the image data is captured. As with detected and projected skylines above, edge 912, 914 and facade depth 916 information can be compared to projected edge and facade information extracted from a 3D model of the building 902. LIDAR depth data may be more robust than detected skyline information and may be given more weight when combining all sources information related to actual camera location.

Calculation of LIDAR depth, for a given a run segment, may first obtain 3D models of one or more nearby buildings. For each building, the building facades which are facing the run segment and have large area and width may be considered. The start and stop positions of the edges of each facade (in local coordinate system) system are computed based on the 3D building model. The start and stop trigger events corresponding to the edges, and the projections of the facade edges onto the run segment are computed. Based on this information the facade depth from the run segment may be obtained.

The start and stop trigger events are passed to a LIDAR depth detection module. The depths of the dominant planes found are passed back. The dominant plane which is closest to the facade of interest (in the centroid sense) is selected and the disparity computed.

The difference of the LIDAR based depth and the existing building model-facade based depth is considered if it is within a given tolerance. This is referred to as the building facade-LIDAR depth based disparity. The average of all the building facade-LIDAR depth based disparities for the entire broadside building facades surrounding the run segment is the LIDAR depth-based figure of merit.

Calculation of LIDAR edges may also begin by obtaining 3D building models for buildings in the vicinity of a given a run segment. For each building the edges may be computed using the building geometry model in local coordinate system. The start and stop positions of the building and the trigger events corresponding to the building are computed.

These start and stop trigger events along with the Lidar unit (left or right broadside) are individually passed to a LIDAR edge detection module. Also, the side of the building in the LIDAR depth image may be provided. The LIDAR edge detection module detects the dominant plane around the building edge and finds the edge depending on the side of the building.

The centroids of the LIDAR detected edges are projected back to the building corner-looking images. Similarly the points (using the same height as a camera, corresponds to building corner position in Local coordinate system) corresponding to building edges from the existing model are projected back. The difference in the column number of these projections (in pixels) is considered for edge based cost or figure of merit. This is an approximate cost based on the assumption that the image frame is perfectly vertical. This is reasonable enough for resolutions typically used in an exemplary geolocation module.

An average of these differences for all the buildings surrounding the run segments is considered as LIDAR edge based cost, or figure of merit, (in pixels).

Figure 10:
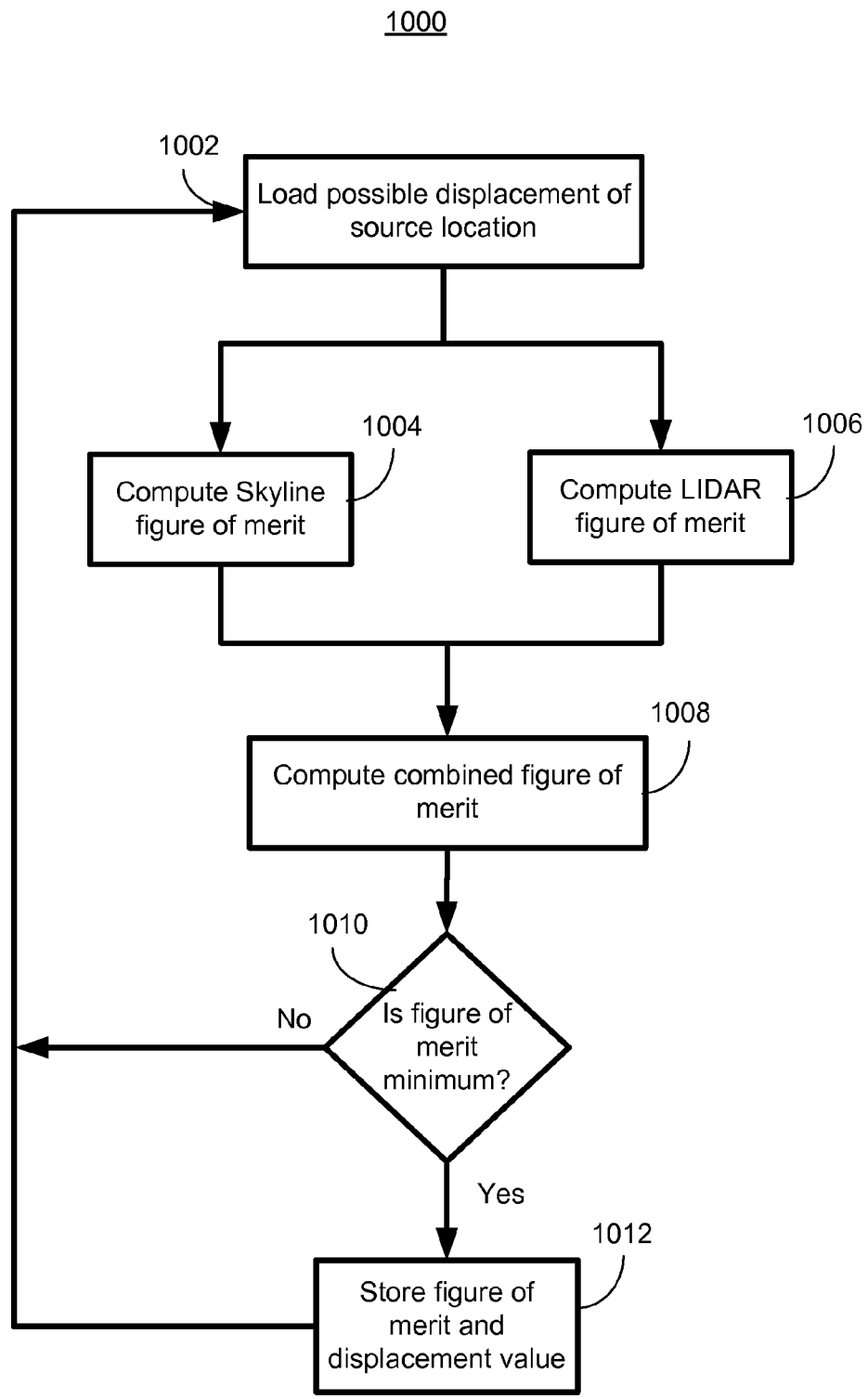
FIG. 10 is a flow chart of a method of image origin adjustment for image registration.

FIG. 10 depicts a method 1000 of determining a displacement value for a source location of image data. At block 1002 a first displacement value of the source location may be loaded. At block 1004, a figure of merit for skyline displacement between a skyline extracted from a source image and a skyline calculated from a corresponding 3D model. A number of source images may be used for skyline figure of merit calculation for each source image displacement being tested.

At block 1006, a figure of merit for LIDAR edge and facade data may be calculated by comparing the LIDAR data and 3D model data.

At block 1008, the skyline and LIDAR figures of merit may be calculated. In one embodiment, the figures of merit are simply added. In another embodiment, one figure of merit, for example, LIDAR data, may be weighted more heavily if its associated data is considered to be more accurate.

At block 1010, the result of block 1008 may be compared to a previously stored minimum value, if any. If the new figure of merit value is lower than the previous minimum, execution may follow the 'yes' branch to block 1012. If the new figure of merit is equal to or greater than the current minimum, execution may follow the 'no' branch, and if more displacement values are to be tested, execution may continue at block 1002.

If the 'yes' branch from block 1010 is taken, at block 1012, the new low value for figure of merit may be stored, as well as the displacement value that resulted in the new low value. If more displacement values need to be tested, execution may continue at block 1002.

When all displacement values have been tested, the displacement value associated with the lowest figure of merit may be used to correct run data.

The ability to use actual images for facades of modeled buildings lends a new level of realism to 3D imagery and geolocation applications. The use of the techniques described above allow automation of what would be a staggering task of image-to-model matching for large amount of geolocation data. As a result, casual users, business application developers, gamers, etc., can enjoy the accuracy and realism of large scale geographic modeling.

Although the foregoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of correcting position data comprising acts of:
assigning a source location to an image;
determining a skyline detail of a building in the image;
extracting a building model corresponding to the skyline detail from a three dimensional scan;
projecting a model skyline detail from the building model onto the skyline detail from the image;
adjusting the source location to align the skyline detail and the model skyline detail in order to match elements in the image with corresponding elements of the model within a limit value, the adjusting the source location further comprises;
  adjusting a start point location over a start point three-dimensional range defined by a three-dimensional cube; and
  using a plurality of images to project a plurality of model details onto a corresponding plurality of building details from each image, where each respective projection is based on a given camera location in different cells of a matrix dividing the cube, the distance between the extracted skyline detail and projected model skyline is calculated as a sum of absolute distances in two dimensions in image coordinates of extracted skyline detail and projected model skyline, the adjusting performs the matching by using the distances as a measure;
recording an adjusted source location resulting from adjusting the source location, to determine a correction factor for the source location, for refining accuracy of geographic position and re-orienting an entire track of a run path comprising a plurality of image capture locations; and utilizing a processor to execute instructions stored in memory to perform at least one of the acts of assigning, determining, extracting, projecting, adjusting, or recording.

2. The method of claim 1, further comprising:
using the adjusted source location when applying the image to the building model.

3. The method of claim 1, wherein determining the skyline detail in the image comprises:
measuring a distance to a facade of the building from the source location.

4. The method of claim 1, wherein determining the skyline detail in the image comprises:
evaluating edges and gradient magnitude;
evaluating pixels on a line associated with a vanishing point; and
estimating the skyline detail from the building model.

5. The method of claim 1, further comprising combining building depth data and the skyline detail when projecting the model detail.

6. The method of claim 1, wherein determining the skyline detail comprises determining a photographic building skyline.

7. The method of claim 1, wherein determining the skyline detail comprises determining a photographic building edge.

8. The method of claim 1, wherein determining the skyline detail comprises determining a LIDAR skyline.

9. The method of claim 1, wherein determining the skyline detail comprises determining a LIDAR building edge.

10. A method of aligning image data to a building model comprising acts of:
capturing street-level building image data information;
assigning a source location to the street-level building image data information;
determining a building skyline, building edge, and a building facade depth in the street-level building image data information;
extracting model information corresponding to a location associated with the street-level building image data information from aerial data;
generating a figure of merit function based on the distance between the building skyline, building edge, and building facade depth and corresponding elements of the model information;
applying the figure of merit function to the corresponding elements of the street-level building image data information and the aerial data for a plurality of locations along a street-scene and linearly combining the respective figures of merit for each of the plurality of locations;
calculating a displacement factor based on an analysis of an output of the figure of merit function;
modifying the source location by iteratively applying and recalculating the displacement factor to the source location;
aligning the street-level building image data information to the building model using the source location modified by the displacement factor; and
utilizing a processor to execute instructions stored in memory to perform at least one of the acts of capturing, assigning, determining, extracting, generating, applying, calculation, modifying or aligning.

11. The method of claim 10, wherein applying the figure of merit function comprises analyzing a street-level skyline and an aerial data skyline.

12. The method of claim 10, wherein applying the figure of merit function comprises analyzing a street-level facade and an aerial data facade.

13. The method of claim 10, wherein applying the figure of merit function comprises analyzing a street-level building edge and an aerial data building edge.

14. A system comprising a computer-readable memory having computer-executable instructions for executing a method comprising acts of:
capturing street-level building information including street-scene image data;
assigning a source location to the street-level building information;
determining a building skyline, building edge, and a building facade depth in the street-level building information;
extracting a building model from aerial data corresponding to a location associated with the street-level building information;
generating a figure of merit function based on a comparison of the building skyline, building edge, and building facade depth and corresponding elements of the building model;
applying the figure of merit function to the corresponding elements of the street-level building information and the building model based on the aerial data for a plurality of locations along a street-scene and linearly combining resulting respective figures of merit for each of the plurality of locations;
determining a displacement factor based on an analysis of an output of the figure of merit function;
modifying the source location by iteratively applying the displacement factor to the source location to refine accuracy of the source location;
aligning the street-scene image data to the building model using the source location modified by the displacement factor; and
a processor that executes the computer-executable instructions associated with at least one of the acts of capturing, assigning, determining, extracting, generating, applying, modifying, or aligning.

15. The computer-readable memory of claim 14, wherein applying the figure of merit function comprises comparing street-level building skyline, edge, and facade information with corresponding aerial data building skyline, edge, and facade information.

16. The computer-readable memory of claim 14, wherein capturing street-level building information comprises capturing street-level building information for both sides of a street.

17. The computer-readable memory of claim 14, wherein capturing street-level building information comprises capturing at least one of a two-dimensional photograph and three dimensional laser ranging (LIDAR) data.

* * * * *